United States Patent
Haraguchi et al.

(12)

(10) Patent No.: US 6,194,871 B1
(45) Date of Patent: Feb. 27, 2001

(54) CHARGE AND DISCHARGE CONTROL CIRCUIT AND APPARATUS FOR SECONDARY BATTERY

(75) Inventors: Akira Haraguchi, Kasugai; Takashi Matsumoto, Tajimi, both of (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/556,306

(22) Filed: Apr. 24, 2000

(30) Foreign Application Priority Data

Dec. 3, 1999 (JP) .................................................. 11-345028

(51) Int. Cl.[7] .................................................. H01M 10/46
(52) U.S. Cl. .............................................. 320/134; 370/136
(58) Field of Search ...................................... 320/116, 118, 320/127, 128, 134, 136, 137, DIG. 12

(56) References Cited

U.S. PATENT DOCUMENTS 5,789,900 * 8/1998 Hasegawa et al. .
5,896,025 * 4/1999 Yamaguchi et al. .
6,111,388 * 8/2000 Makainakano .

FOREIGN PATENT DOCUMENTS 5-276682  10/1993 (JP) .
7-23532   1/1995 (JP) .
9-140066  5/1997 (JP) .
9-163612  6/1997 (JP) .
10-12282  1/1998 (JP) .

* cited by examiner

Primary Examiner—Edward H. Tso
(74) Attorney, Agent, or Firm—Armstrong, Westerman, Hattori, McLeland & Naughton (57) ABSTRACT

One end of a resistor R1 is connected to a charger detection terminal OCV and the other end of the resistor R1 is connected to a base terminal of an NPN type bipolar transistor Q2 of open collector structure to thereby supply a driving bias current. An emitter terminal of the transistor Q2 is connected to a reference potential and a collector terminal of the transistor Q2 is connected to a gate terminal COUT of a charge control P type FET 204. Not only the resistor R1 but also a collector terminal of an NPN type bipolar transistor Q1 of an open collector structure is connected to the base terminal of the transistor Q2. An emitter terminal of the transistor Q1 is connected to the reference potential and an overcharge control signal from an overcharge control circuit 231 is connected to a base terminal of the transistor Q1. If a voltage of not less than a predetermined voltage value is applied to the charger detection terminal OCV, the transistor Q2 is turned on and makes the charge control P type FET 204 conductive to thereby charge a battery. When receiving the overcharge control signal, the transistor Q1 is turned on, bypasses a bias current of the transistor Q2 supplied from the charger detection terminal OCV and turns off the transistor Q2 to thereby prohibit charge operation.

18 Claims, 8 Drawing Sheets

FIG.1

FIG.2 FIRST MODIFICATION OF FIRST EMBODIMENT

VOLTAGE CONVERSION CIRCUIT UTILIZABLE
IN FIRST AND SECOND EMBODIMENTS

FIG.3A  OCV

FIG.3B  OCV

FIG.3C

FIG.3D  OCV

FIG.4 SECOND MODIFICATION OF FIRST EMBODIMENT

FIG.5 SECOND EMBODIMENT

FIG.6

FIG.7 PRIOR ART
CHARGE AND DISCHARGE CONTROL CIRCUIT IN PRIOR ART

FIG.8 PRIOR ART
CIRCUIT EXAMPLE TO EXPLAIN DIFFERENCE BETWEEN CIRCUITS OF PRIOR ART AND PRESENT INVENTION

CHARGE AND DISCHARGE CONTROL CIRCUIT AND APPARATUS FOR SECONDARY BATTERY

BACKGROUND OF THE INVENTION

1. Field of the Invention

The present invention relates to a charge and discharge control circuit and an apparatus for preventing overcharge and overdischarge in a secondary battery pack such as a lithium-ion secondary battery used in various types of portable equipment. The present invention particularly relates to a charge and discharge control circuit and an apparatus which are optimum in view of battery life and ensuring the safety of a battery.

2. Prior Art

Secondary batteries such as a lithium-ion secondary battery are frequently used following the spread of various types of portable equipment. Because of its structure and chemical property, however, a secondary battery has the following disadvantages. In an overcharge state, gas due to solution vaporization may be generated and solution leakage may occur within a battery. In an overdischarge state, electrodes may be eluted within a solution. As a result, there is a possibility of the breakdown of the battery, the deterioration of battery characteristics and the like. Therefore, measures have been conventionally taken against overcharge and overdischarge in various manners.

Figure 7:
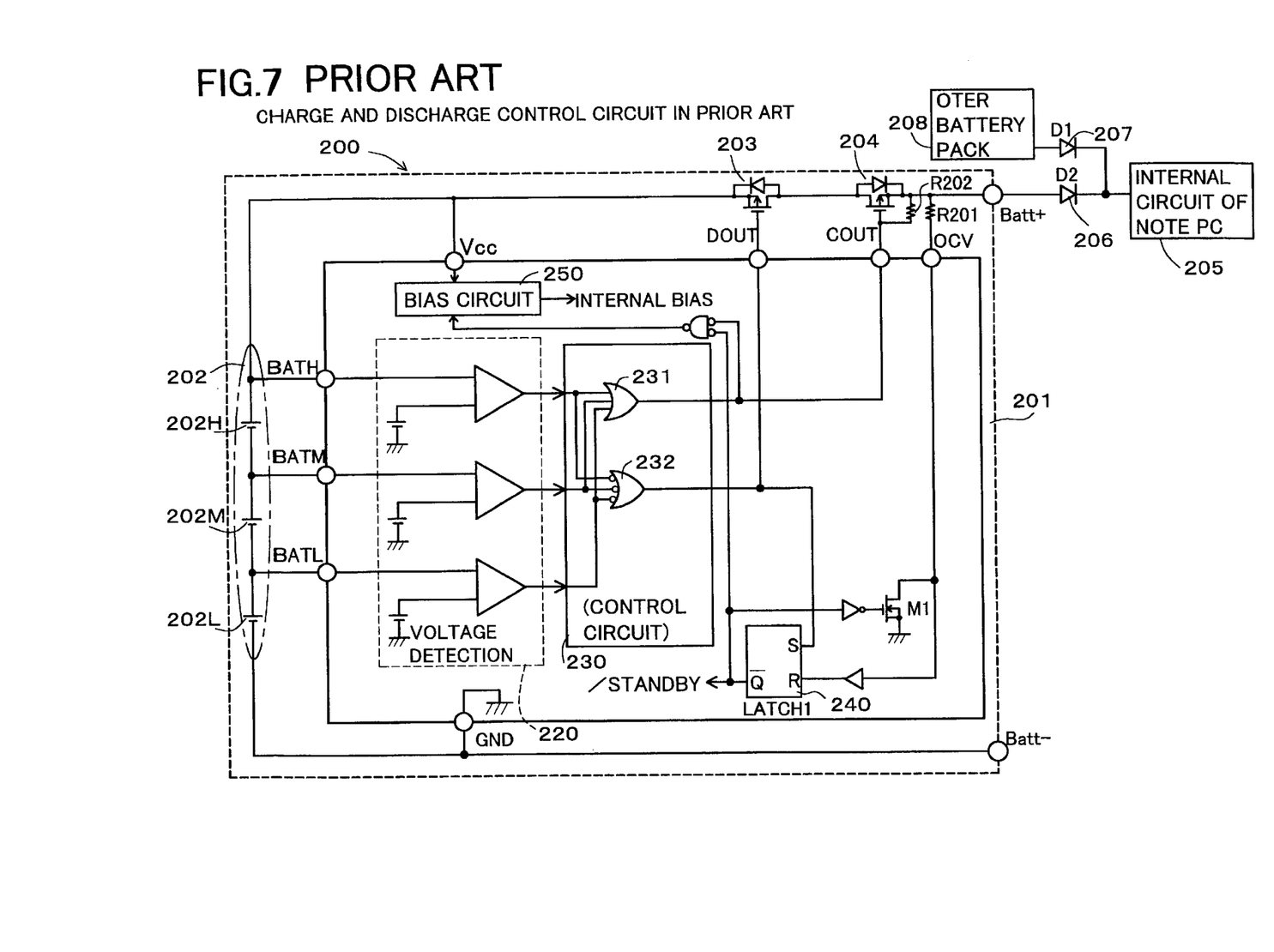
FIG. 7 is a circuit diagram of a secondary battery pack including a charge and discharge control circuit used in a prior art.

FIG. 7 is an internal circuit diagram showing secondary battery packs 200 and 208 used for a battery such as a conventionally used lithium-ion secondary battery. In this case, the secondary battery packs are used as power supplies for a notebook-size personal computer (to be referred to as "notebook PC" hereinafter). The two battery packs 200 and 208 are connected to the internal circuit 205 of the notebook PC through back flow prevention diodes D1 and D2.

In the battery pack 200, a plurality of secondary battery cells (which are three secondary battery cells 202H, 202M and 202L in FIG. 7) are connected in series to thereby constitute a battery 202 as a whole. The negative voltage side of the battery 202 is connected to the negative terminal Batt− of the battery pack 200 and the source terminal of a discharge control P type field effect transistor (to be referred to as "FET" hereinafter) 203 is connected to the positive voltage side of the battery 202. Also, the drain terminal of the FET 203 is connected to the drain terminal of a charge control P type FET 204 and the source terminal of the FET 204 is connected to the positive terminal Batt+ of the battery pack 200. Battery voltage is thus outputted between the negative terminal Batt− and the positive terminal Batt+ of the battery pack 200 and then supplied to the internal circuit 205 of the notebook PC acting as a load. A charger detection terminal OCV is connected to the positive terminal Batt+ of the battery pack 200 to detect that a charger (not shown) is connected to the battery pack. In addition, a current limiting resistor R201 is inserted between the positive terminal Batt+ and the OCV terminal to prevent overcurrent at the time of erroneously connecting the battery pack 200 and the charger (not shown).

In the charge and discharge control circuit 201, a voltage detector circuit 220 is connected to each of the battery cells 202H, 202M and 202L and monitors the voltage value of each of the battery cells 202H, 202M and 202L. Each battery cell 202H, 202M or 202L has a structure independent of other cells due to the need to protect the cell against overcharge and overdischarge independently. If at least one of the battery cells 202H, 202M and 202L is turned into an overcharge state, then the output of the corresponding voltage detector circuit 220 is inverted and the gate terminal COUT of the charge control P type FET 204 is set at a high level by an overcharge control circuit 231 outputting a logic sum of the voltage detector circuits 220 to thereby make the FET 204 nonconductive and disconnect a charge path.

Conversely, if at least one of the battery cells 202H, 202M and 202L is turned into an overdischarge state, then the output of the corresponding voltage detector circuit 220 is inverted and the gate terminal DOUT of a discharge control P type FET 203 is set at a high level by an overdischarge control circuit 232 outputting the logical sum of the voltage detector circuits 220 to thereby make the FET 203 nonconductive and disconnect a discharge path. At the same time, this overdischarge state is latched by a latch circuit 240 and the charge and overdischarge control circuit 201 is turned into a standby state. At this moment, if the overcharge state is not detected, a bias circuit 250 is made inactive and the internal bias of the charge and discharge control circuit 201 is stopped to turn the circuit 201 into a complete dormant state. Then, no current is consumed in the charge and discharge control circuit 201, so that the secondary battery 202 which has supplied the internal bias is not consumed and the battery voltage is not decayed for a long time. Accordingly, it is unlikely that after the circuit 201 is halted in an overdischarge state, the battery voltage is unnecessarily decayed and battery characteristics unnecessarily deteriorates.

In recharge operation, the negative terminal and the positive terminal of the charger (not shown) are connected to the negative terminal Batt− and the positive terminal Batt+ of the battery pack, respectively, thereby turning the charger detection terminal OCV into a high level. Thus, the latch circuit 240 which has latched the overdischarge state is reset, the charge and discharge control circuit 201 is out of the standby state, the bias circuit 250 starts operation and the internal bias is applied. The gate terminal COUT of the charge control P type FET 204 is turned into a low level by the overcharge control circuit 231, the FET 204 is made conductive and thereby charge operation is started. This state continues until an overdischarge state is detected and the battery cells 202H, 202M and 202L are charged in this state until then.

Next, it is assumed that the battery pack 200 is in an overdischarge state and the other battery pack 208 is in a charge state. In this case, while the voltage of the positive terminal Batt+ of the battery pack 200 is low in level, the cathode of the diode D1, i.e., the cathode of the diode D2 is high voltage level and the diode D2 is reversely biased and a reverse leak current flows into the battery pack 200. If the voltage level of the charger detection terminal OCV is increased due to the leak current, there is fear that the charge and discharge control circuit 201 erroneously recognizes that the charger (not shown) is connected to the battery pack 200 and turns on the internal bias, and that charge operation is erroneously started. In this example, to prevent this erroneous operation, a leak current drawing N-type FET (M1) is connected between the charger detection terminal OCV and a reference voltage, and made conductive in a standby state to thereby let the leak current flow to the reference potential. By regulating the residual voltage of the charger detection terminal OCV to about 0.3V with respect to the leak current of about 300 $\mu$A while the leak current drawing N-type FET (M1) is conductive, the charge operation by the latch reset is prevented from being erroneously started.

In the above-stated charge and discharge circuit 201, after the battery pack 200 is turned into an overdischarge state, the internal bias turns into a halt state under conditions that all of the battery cells 202H, 202M and 202L are not in an overcharge state, the consumption of the battery 202 is stopped and thereby the battery voltage is not decayed for a long time.

Nevertheless, there exists a leak current, though only slightly, in the battery 202 itself or the charge and discharge control circuit 202 or the like. Then, if the battery 202 is left untouched for a long time, the battery voltage gradually decays and the battery is completely discharged without any residual voltage in the end. If the battery is in such a state, no power is supplied to the charge and discharge control circuit 201 and the circuit 201 becomes inoperative to thereby make it disadvantageously impossible to carry out recharge operation.

Figure 8:
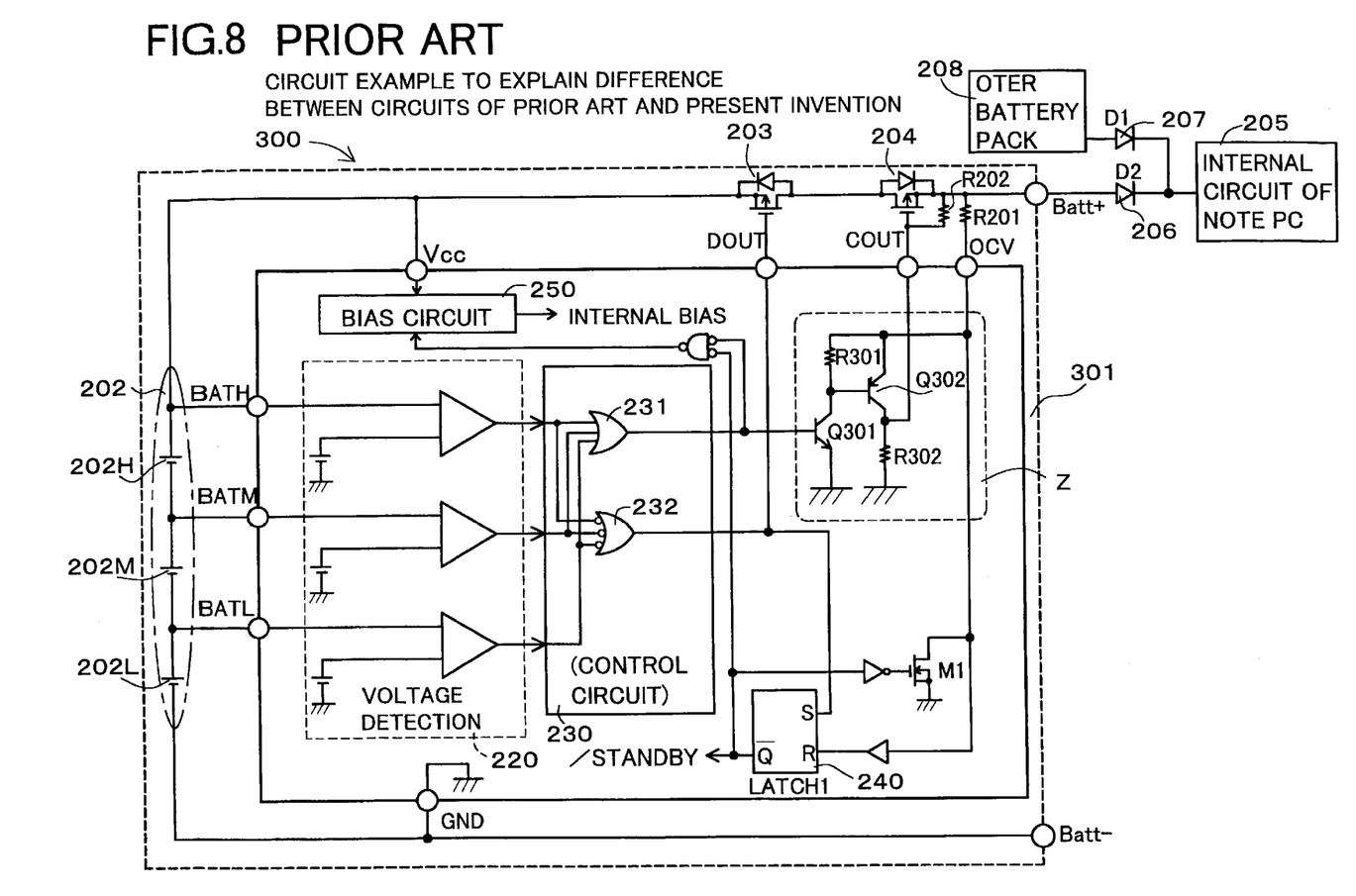
FIG. 8 is a circuit diagram of an exemplary circuit for explaining differences between the charge and discharge control circuit of FIG. 7 and that of the present invention.

FIG. 8 is a circuit diagram showing a battery pack 300 which is proposed to avoid the above-stated disadvantages. Specifically, a charge controlling output circuit Z in a charge and discharge control circuit 301 is provided to avoid the disadvantages. In the charge controlling output circuit Z, the gate terminal COUT of a charge control P type FET 204 is connected to the reference potential through a resistor R302 to maintain the potential of the gate terminal COUT of the charge control P type FET 204 at a low level irrespectively of battery voltage. Therefore, when a charger (not shown) is connected to the battery pack 300, the charge control P type FET 204 is made conductive irrespectively of battery voltage and a battery 202 can be recharged even after it is completely discharged.

Further, to turn the charge control P type FET 204 into a nonconductive state during overcharge, the charge controlling output circuit Z is provided with a PNP type bipolar transistor Q302 having a collector terminal and an emitter terminal connected to the gate terminal COUT of the charge control P type FET 204 and to a charger detection terminal OCV, respectively and having a base terminal to which the charger detection terminal OCV is connected through a resistor R301. Further, an NPN type bipolar transistor Q301 for base bias application is connected to the base terminal of the transistor Q302. The base terminal of the NPN type bipolar transistor Q301 is controlled by an overcharge control circuit 231. When the battery 300 is overcharged, the NPN type bipolar transistor Q301 is made conductive and applied with a bias current, the PNP type bipolar transistor Q302 is made conductive and the gate terminal COUT of the charge control P type FET 204 is connected to the charger detection terminal OCV. If a charger (not shown) is connected to the battery pack 300, the charger detection terminal OCV is high in level. Therefore, no potential difference exists between the gate terminal COUT and the source terminal of the charge control P type FET 204 and the charge control P type FET 204 becomes nonconductive, thereby making it possible to prevent erroneously charging the battery during overcharge.

In this example, however, the charge controlling output circuit z cannot disadvantageously operate normally if a reverse leak current flows into the battery pack 300 through a diode D2. That is, if at least one of the battery cells 202H, 202M and 202L is turned into an overdischarge state and the battery cell in an overcharge state is mixed with the battery cells in a state other than the overdischarge state, then a leak current drawing N-type FET (M1) is made conductive to prevent a latch circuit 240 from being reset to latch the overdischarge state and the charge controlling output circuit Z operates to connect the gate terminal COUT of the charge control P type FET 204 to the charger detection terminal OCV so as to stop charge operation. The potential of the charger detection terminal OCV at this moment is, however, decreased to about 0.3V by making the leak current drawing N-type FET (M1) conductive and the potential is lower than that of the positive terminal Batt+, i.e., that of the source terminal of the charge control P type FET 204 through a current limiting resistor R201. Owing to this, even if the lowered voltage of the charger detection terminal OCV is connected to the gate terminal COUT of the charge control P type FET 204 through the charge controlling output circuit Z, the potential difference between the gate terminal COUT and the source terminal of the charge control P type FET 204 remains higher than the threshold voltage of the FET 204 and the FET 204 cannot be turned into a nonconductive state depending on conditions. The charge controlling output circuit Z cannot, therefore, operate normally.

As stated above, the charge and discharge control circuit 201 shown in FIG. 7 is capable of reducing the consumption of the battery 202 after overdischarge as much as possible, stopping the unnecessary decrease of battery voltage to thereby prevent the deterioration of battery characteristics and preventing the battery from being erroneously charged by the other battery pack 208. The charge and discharge control circuit 201 has, however, disadvantage in that the battery cannot be recharged after the battery voltage is completely discharged.

The charge and discharge control circuit 301 shown in FIG. 8 allows the battery to be recharged after the battery voltage is completely discharged. However, the circuit 301 has disadvantage in that the circuit 301 cannot function in conformity with the function of preventing the battery from being erroneously charged by the other battery pack 208 and in that erroneous charge cannot be prohibited when a reverse leak current flows into the battery through the diode D2 from the other battery pack 208.

SUMMARY OF THE INVENTION

The present invention has been made to solve the above-stated disadvantages. It is, therefore, an object of the present invention to provide a charge and discharge control circuit an apparatus for a secondary battery capable of simultaneously solving the two problems in conformity with each other, i.e., preventing a battery from being erroneously charged by another battery pack even if a plurality of battery packs are connected in parallel and, at the same time, recharging the battery even after battery voltage is completely discharged.

In order to accomplish the above-stated object, according to one aspect of the present invention, it is provided a charge and discharge control circuit for an external secondary battery, the charge and discharge control circuit making an external charge control switch nonconductive based on that an overcharge state of the external secondary battery is detected and interrupting a charge operation of the external secondary battery, the charge and discharge control circuit comprising:

a charge control element for making the charge control switch conductive when a first voltage not less than a predetermined voltage is applied to a detection terminal for detecting whether a charger is connected thereto or not, thereby making the charge operation of the secondary battery possible, and for making the charge control switch nonconductive when a second voltage not more than the predetermined voltage is applied to the detection terminal, thereby making the charge operation of the secondary battery impossible.

According to the above charge and discharge control circuit, only if a first voltage not less than a predetermined value is applied to the detection terminal, the circuit judges that the secondary battery is set in a charge state and then makes the charge control switch conductive. This makes it possible for a battery charger to charge the secondary battery connected to the detection terminal. The battery voltage of the secondary battery does not concern in the operation of this time. Due to this, even if the battery voltage of the secondary battery is completely discharged, the secondary battery can be recharged. Further, if the voltage applied to the detection terminal is a second voltage not more than the predetermined value, the charge control switch is made nonconductive to thereby prohibit the secondary battery from being charged. Thus, even if the voltage of the detection terminal increases due to the fact that a plurality of battery packs each consisting of a secondary battery are connected in parallel and a current flows into one battery pack from the other battery pack, the charge operation for erroneously charging the secondary battery is not started as long as the voltage is not more than the predetermined voltage value.

Further, according to another aspect of the present invention, the charge control element may include a first switching element which turns on based on the first voltage not less than the predetermined voltage and makes the charge control switch conductive, and turns off based on the second voltage not more than the predetermined voltage and makes the charge control switch nonconductive. According to this charge and discharge control circuit, only if the first voltage not less than a predetermined value is applied to the detection terminal, the first switching element is made conductive to thereby make the charge control switch conductive. If the voltage applied to the detection terminal is a second voltage not more than the predetermined value, the first switching element is made nonconductive to thereby make the charge control switch nonconductive. In this way, it is possible to set a threshold value for switching the conductive state of the first switching element depending on the predetermined voltage value applied to the detection terminal. This can ensure switching the conductive state of the charge control switch at a predetermined threshold voltage and controlling both a state in which the battery can be charged and a state in which the battery is prohibited from being charged.

BRIEF DESCRIPTION OF THE DRAWINGS

The accompanying drawings which are incorporated in and constitute a part of this specification illustrate embodiments of the invention and, together with the description, serve to explain the objects, advantages and principles of the invention.

In the drawings.

DETAILED DESCRIPTION OF THE PREFERRED EMBODIMENTS

A charge and discharge control circuit according to the present invention will be described in detail based on the first and second embodiments according to the present invention with reference to the accompanying drawings.

Figure 1:
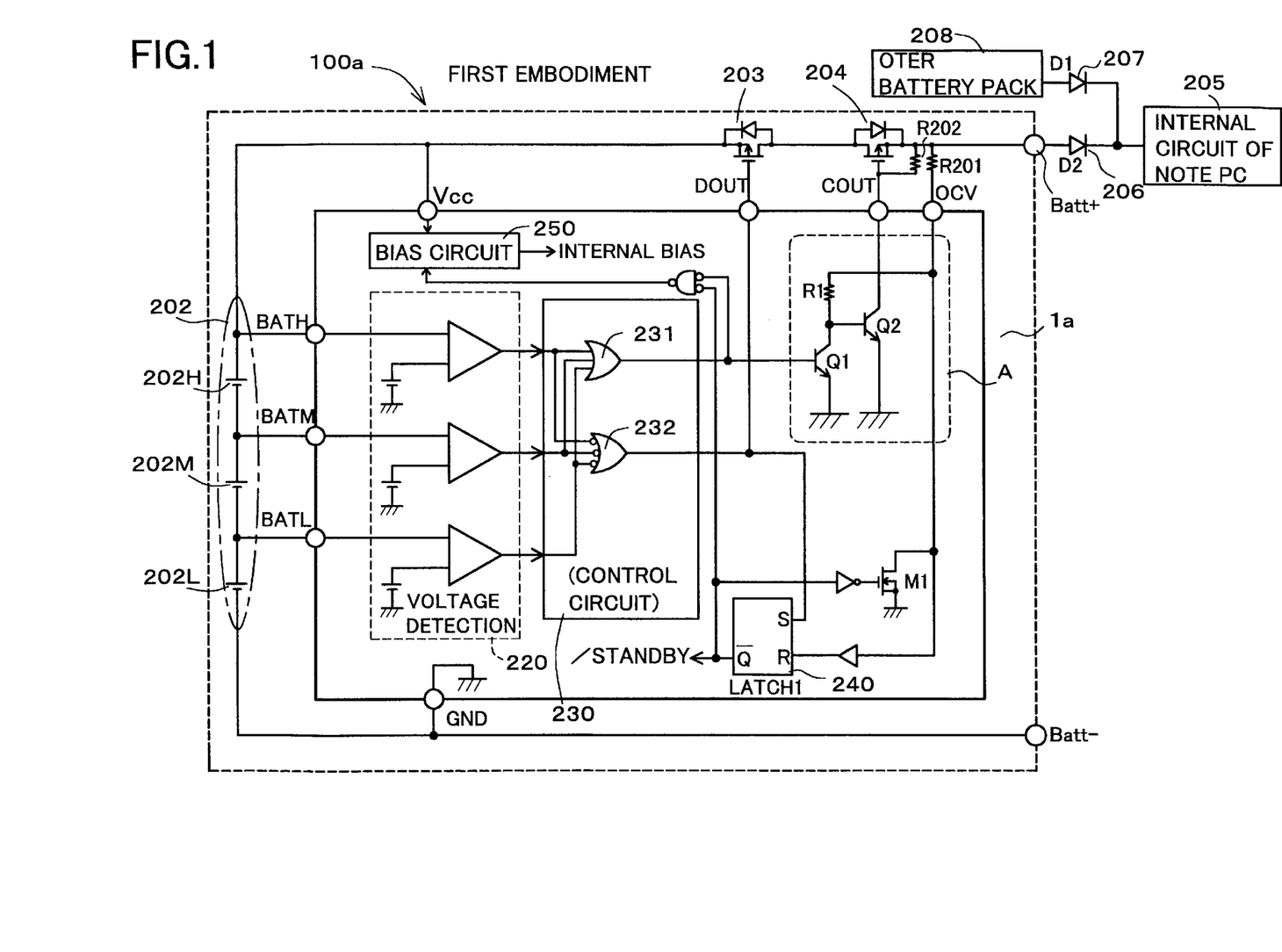
FIG. 1 is a circuit diagram of a secondary battery pack including a charge and discharge control circuit in a first embodiment according to the present invention.

FIG. 1 shows a charge and discharge control circuit 1a in the first embodiment according to the present invention. It is noted that the same constituent elements in the circuit 1a shown in FIG. 1 as those described in "Prior Art" part are denoted by the same reference symbols and no description will be given thereto herein.

A charge controlling output circuit A is an output circuit for controlling the conductive state of a charge control P type FET 204 in this embodiment. One end of a resistor R1 is connected to a charger detection circuit OCV and the other end of the resistor R1 is connected to the base terminal of an NPN type bipolar transistor Q2 of open collector structure to supply a driving bias current to the NPN type bipolar transistor Q2. The emitter terminal of the NPN type bipolar transistor Q2 is connected to a reference potential and the collector terminal thereof is connected to the charge control P type FET 204 through the gate terminal COUT of the FET 204. Not only the resistor R1 but also the collector terminal of an NPN type bipolar transistor Q1 of open collector structure is connected to the base terminal of the transistor Q2. The emitter terminal of the NPN type bipolar transistor Q1 is connected to the reference potential and an overcharge control signal from an overcharge control circuit 231 is supplied to the base terminal of the transistor Q1. When receiving the overcharge control signal, the NPN type bipolar transistor Q1 is driven and bypasses the bias current of the NPN type bipolar transistor Q2 supplied from the charger detection terminal OCV to thereby turn off the NPN type bipolar transistor Q2.

In the charge and discharge control circuit, the bipolar transistor Q1 is an open collector circuit. Thus, the bipolar transistor Q1 amplifies the current of the overcharge detection signal biased to the base terminal and outputs a collector current. It is, therefore, possible to promptly determine the conductive state of the transistor Q2 and the charge operation state.

The charge control FET 204 is a P type FET in this embodiment. Due to this, if the gate terminal COUT is biased to a negative voltage equal to or lower than a threshold voltage with respect to the source terminal, the FET 204 is made conductive. If the NPN bipolar transistor Q2 is actuated, the collector terminal draws a current, which is drawn out of the positive terminal Batt+ of the battery pack 100a for a lithium-ion secondary battery or the like through a resistor R202 connected between the gate terminal COUT and the source terminal of the charge control P type FET 204. Then, the gate terminal COUT is applied with a negative voltage relative to the source terminal and the charge control P type FET 204 is turned into a conductive state, thereby charging a secondary battery 202 such as a lithium-ion secondary battery. Conversely, if the NPN type bipolar transistor Q2 is turned off, no current flows and the gate terminal COUT and the source terminal of the charge control P type FET 204 become equal in potential through the resistor R202. Thus, the charge control P type FET 204 is turned into a nonconductive state and a charge path toward the secondary battery 202 is disconnected.

Here, it is assumed that voltage detector circuits 220 monitoring battery cells 202H, 202M and 202L, respectively in the charge and discharge control circuit 1a do not detect an overcharge state. An overcharge control circuit 231 which outputs the logical sum of the voltage detector circuits 220, does not output an overcharge control signal. Then, the NPN type bipolar transistor Q1 is turned off and a path which bypasses a bias current is disconnected. In this state, if a positive voltage is applied between the negative terminal Batt− and the positive terminal Batt+ of the battery pack 100a while the negative terminal Batt− is assumed to have a reference potential, the positive voltage is also applied to the charger detection terminal OCV to thereby bias the base terminal of the NPN type bipolar transistor Q2 through the resistor R1. At this moment, if the potential of the base terminal of the NPN type bipolar transistor Q2 is about 0.7V which is a positive forward voltage (to be referred to as "Vbe" hereinafter) between the base and emitter terminals and which is necessary to actuate the NPN type bipolar transistor Q2, then the NPN type bipolar transistor Q2 operates. The bias current of this time is determined by the voltage applied to both ends of the resistor R1. The voltage of the NPN type bipolar transistor Q2 side terminal of the resistor R1 is the voltage Vbe of the transistor Q2. Owing to this, if a voltage higher than the voltage Vbe is applied to the charger detection terminal OCV, the NPN type bipolar transistor Q2 is turned on and the charge control P type FET 204 is made conductive to thereby make it possible to charge the battery 202. The voltage is about 0.7V, i.e., the voltage Vbe.

Thus, it is possible to automatically set a predetermined voltage at an operating voltage for operating the bipolar transistor Q2 of an open collector connection for controlling the conductive state of the charge control switch, i.e., about 0.7V without the need to provide a special configuration.

The voltage required for charge operation is only a charging voltage applied between the negative terminal Batt− and the positive terminal Batt+ and is not dependent on battery voltage. For that reason, even if the battery 202 is left untouched for a long time and the battery voltage is completely discharged without any residual voltage, the battery 202 can be recharged.

If the battery voltage remains but at least one of the battery cells 202H, 202M and 202L is in an overdischarge state, the overdischarge control circuit 232 outputs an overdischarge control signal and sets the latch circuit 240. At this moment, even if a reverse leak current flows into the battery pack 100a through the diode D2 from the other battery pack 208, the voltage of the charger detection terminal OCV is kept a low voltage of about 0.3V. This is because the leak current drawing N-type FET (M1) is made conductive. Since the voltage of the charger detection terminal OCV when the charge operation starts is set to be about 0.7V or higher, the charge operation does not erroneously start because of inflow of the leak current.

Next, if the voltage detector circuit 220 of one of the battery cells 202H, 202M and 202L in the charge and discharge control circuit 1a detects the overcharge state of the corresponding battery cell, the overcharge control circuit 231 which outputs the logical sum of the voltage detector circuits 220 outputs an overcharge control signal and turns on the NPN type bipolar transistor Q1 to thereby bypass the bias current of the NPN bipolar transistor Q2. In this state, the bias current derived from the voltage applied to the charger detection terminal OCV is bypassed to the reference potential by the NPN type bipolar transistor Q1 through the resistor R1. Accordingly, even if a charger (not shown) is connected to the battery pack 100a, no bias current is supplied to the base terminal of the NPN type bipolar transistor Q2. The NPN bipolar transistor Q2 is, therefore, kept off, the charge control P type FET 204 is kept nonconductive and the charge path toward the secondary battery 202 is kept disconnected.

In the charge and discharge control circuit, even if a voltage of a predetermined value is applied to the detection terminal OCV and the charge and discharge control circuit judges that the secondary battery 202 is in a charge state, it is possible to prohibit the FET204 from being made conductive based on that the overcharge state of the secondary battery 202 is detected. Accordingly, even if a charger is connected to the battery pack and a battery cell in an overcharged state exists, the battery is not erroneously charged. Hence, this charge and discharge control circuit has advantage in that battery characteristics do not deteriorate and problems related to safety and the like do not occur.

This operation is ensured when the voltage detection circuit 220 detects the overcharge state in one of the battery cells 202H, 202M and 202L. Accordingly, it is possible to ensure that the battery 202 is prevented from being erroneously charged even if a reverse leak current flows into the battery pack 100a through the diode D2 from the other battery pack 208 in a state in which the overcharged battery cell is mixed with the overdischarged cells.

Figure 2:
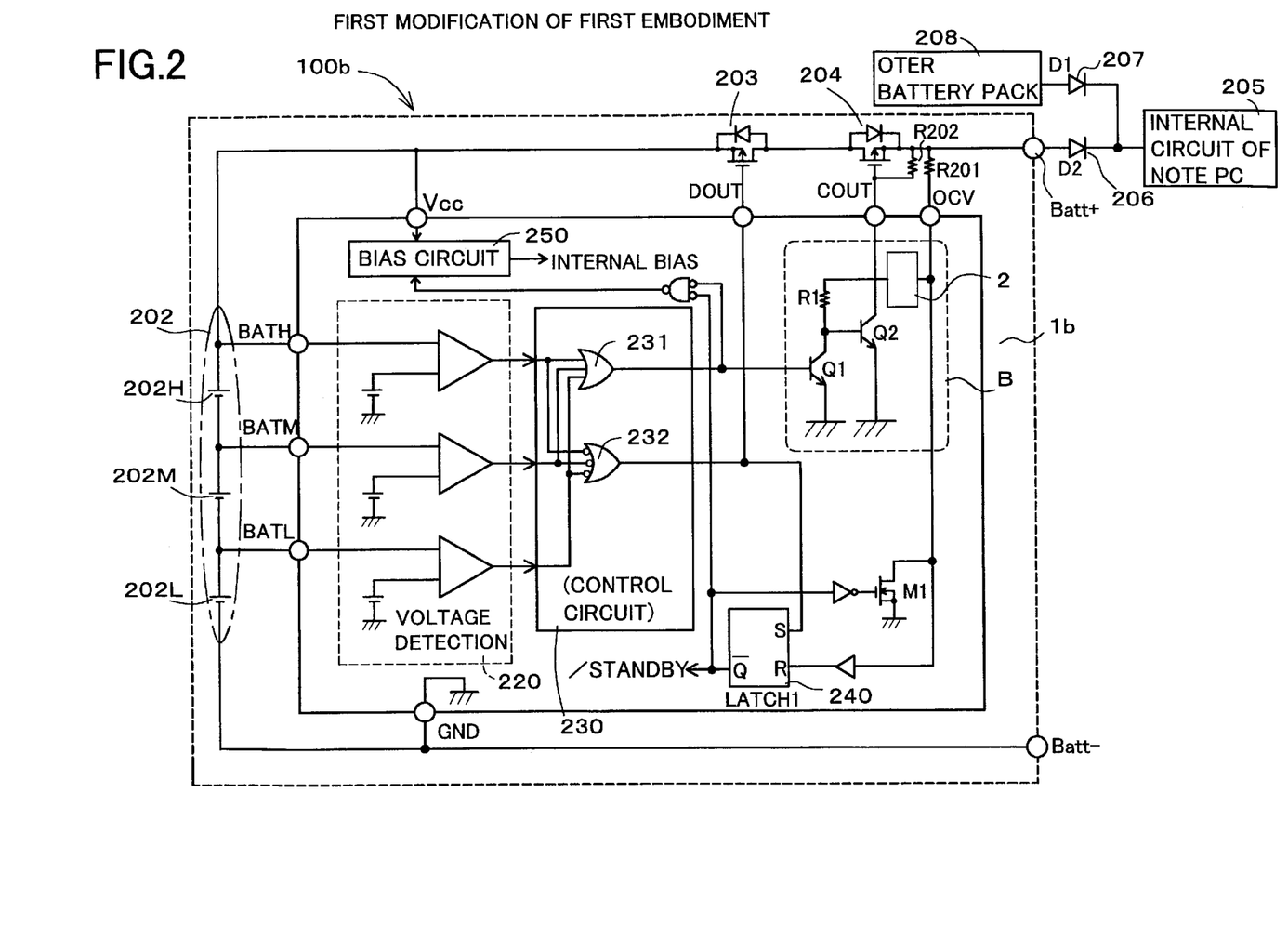
FIG. 2 is a circuit diagram of a secondary battery pack including a charge and discharge control circuit which is a first modified embodiment of the first embodiment.

FIG. 2 shows a charge and discharge control circuit 1b which is the first modified embodiment of the first embodiment according to the present invention. It is noted that the same constituent elements in the circuit 1b shown in FIG. 2 as those described in "Prior Art" part are denoted by the same reference symbols and no description thereto will be given herein. A charge controlling output circuit B is an output circuit for controlling the conductive state of a charge control P type FET 204 in this modified embodiment. A resistor R1 and NPN type bipolar transistors Q1 and Q2 are same in configurations as those in the charge and discharge control circuit 1a in the first embodiment shown in FIG. 1. The charge and discharge control circuit 1b in this modified embodiment differs from that in the first embodiment in that a voltage conversion circuit 2 is added to the configuration of the charge discharge control circuit 1a, i.e., the circuit 2 is inserted between the resistor R1 and a charger detection terminal OCV. If a bias current is supplied to the base of the NPN bipolar transistor Q2 through the voltage conversion circuit 2, a voltage decreased to a predetermined voltage level from that of the charger detection terminal OCV is applied to the resistor R1. Since the voltage Vbe at which the NPN type bipolar transistor Q2 is turned on is the same as that in the case of the charge and discharge control circuit 1a in the first embodiment, the circuit 1b starts charge operation at a higher voltage of the charger detection terminal OCV by the extent that the voltage conversion circuit 2 is inserted on the bias current path. Therefore, it is possible to start charge operation at a predetermined voltage of the charger detection terminal OCV set by the voltage conversion circuit 2. It is also possible to set the voltage of the charger detection terminal OCV at the start of charge operation to be higher than that of the charger detection terminal OCV at a time a reverse leak current flows into the circuit 1b through the diode D2 from the other battery pack 208, i.e., higher than about 0.3V, thereby preventing the battery from being charged erroneously more surely.

In the charge and discharge control circuit, the voltage value which voltage level is shifted is applied to the transistor Q2 through the voltage conversion circuit 2 from the detection terminal OCV. Accordingly, by appropriately regulating the shift amount of the voltage level through the regulation element, it is possible to conveniently, freely set the predetermined voltage value of the detection terminal OCV which judges that the secondary battery 202 is set in a charge state.

Figure 3A:
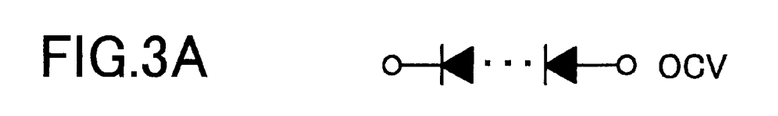
FIGS. 3A, 3B, 3C and 3D are circuit diagrams in specific examples of various types of voltage conversion circuits applicable to the first and second embodiments.

FIGS. 3A–3D show the specific examples of various types of voltage conversion circuits 2 applicable to this embodiment. Namely, FIG. 3A shows a voltage conversion circuit in which the anode and cathode terminals of a predetermined number of diodes are connected in series so as to regulate a voltage to a desired value for starting charge operation. Among the terminals on the both ends of the serially connected diode sequence, the anode terminal serves as the input terminal of the voltage conversion circuit 2 and the cathode terminal serves as the output terminal of the voltage conversion circuit 2. When a bias current flows to the base terminal of the NPN type bipolar transistor Q2 shown in FIG. 2, the current is also flows through the diode sequence and forward voltage, thereby, falls by about 0.7V for each diode. Voltage fall is accumulated, corresponding to the predetermined number of diodes and the voltage falls by a predetermined value.

Figure 3B:
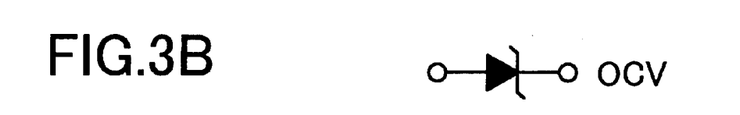

FIG. 3B shows a voltage conversion circuit which utilizes a constant voltage characteristic which is the reverse bias characteristics of a Zener diode as voltage conversion elements. The cathode terminal of the Zener diode serves as the input terminal of the voltage conversion circuit 2 and the anode terminal serves as the output terminal thereof. In this example as in the case of the diode sequence shown in FIG. 3A, if a bias current flows to the base terminal of the NPN type bipolar transistor Q2 shown in FIG. 2, a reverse current flows to the Zener diode to reversely bias the diode and a voltage falls by a predetermined value.

Figure 3C:
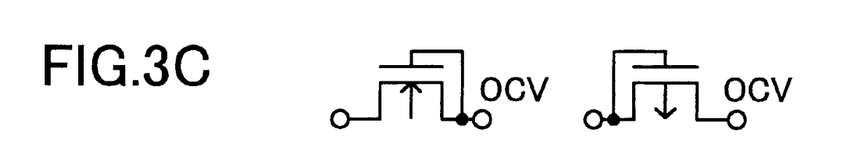

FIG. 3C shows a voltage conversion circuit in which FET elements are diode-connected as voltage conversion elements. Namely, in case of an N-type FET element, the drain and gate terminals of the FET element are connected to provide an anode terminal and the source terminal of the FET element serves a cathode terminal. In case of a P-type FET element, the source terminal of the FET element serves an anode terminal and the drain and gate terminals of the FET element are connected to provide a cathode terminal. The diode characteristics of FIG. 3C are the same as those shown in FIG. 3A. Therefore, if FET elements are connected in the same manner as the diode sequence of FIG. 3A, the circuit shown in FIG. 3C can obtain the same advantage.

Figure 3D:
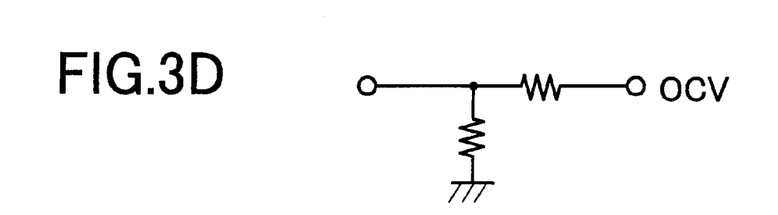

FIG. 3D shows a voltage conversion circuit in which two resistors are connected in series, the terminal of one of the resistors serves as the input terminal of the voltage conversion circuit 2, that of the other resistor is connected to a reference potential and the node between the two resistors serves as the output terminal of the voltage conversion circuit 2. Voltage conversion is made according to the resistive potential division effect. The circuit of FIG. 3D is effective if driving elements are of voltage drive type and no bias current flows.

Figure 4:
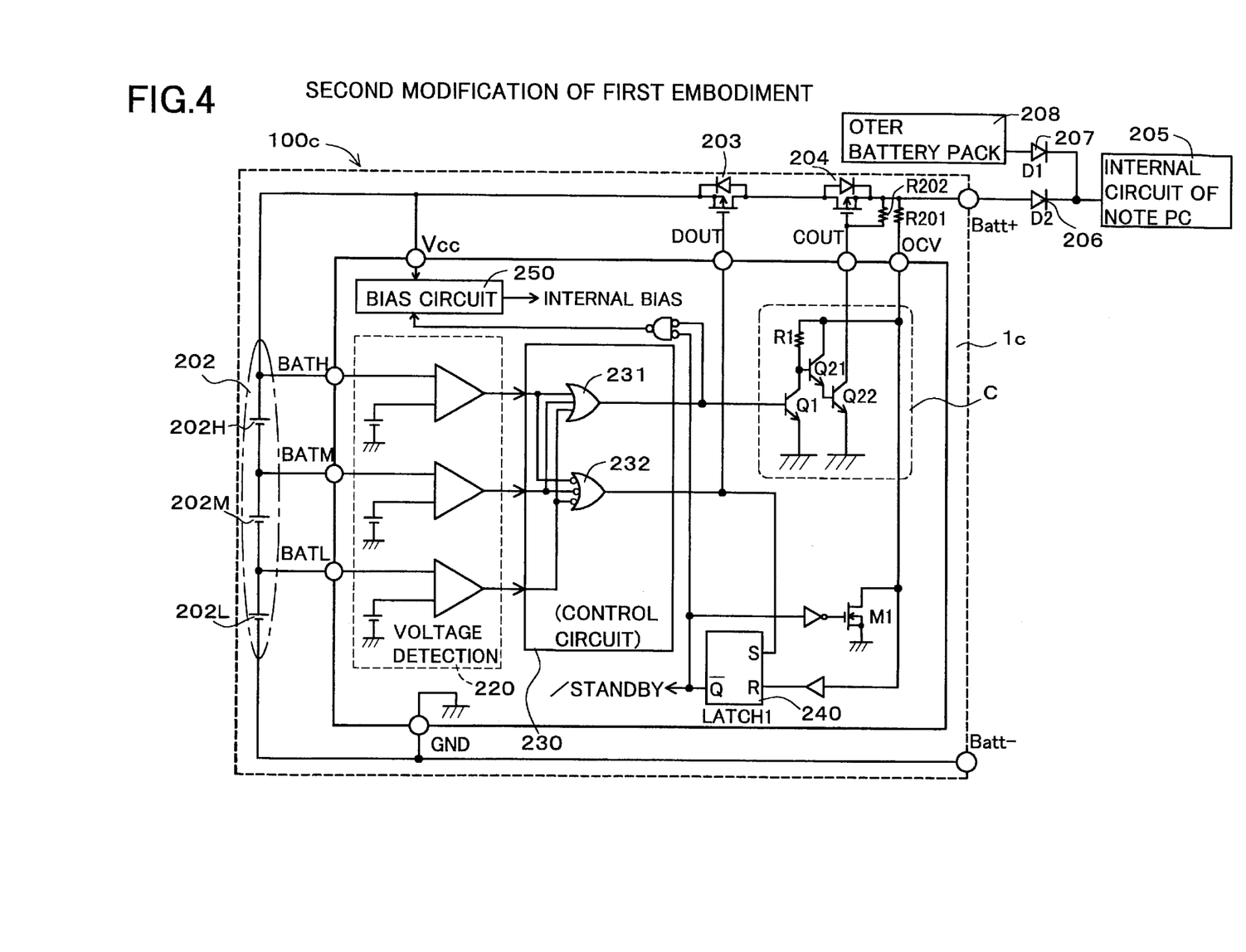
FIG. 4 is a circuit diagram of a secondary battery pack including a charge and discharge control circuit in a second modified embodiment of the first embodiment.

FIG. 4 shows a charge and discharge control circuit 1c as the second modified embodiment of the first embodiment according to the present invention. It is noted that the same constituent elements in the circuit Ic shown in FIG. 4 as those described in "Prior Art" part are denoted by the same reference symbols and no description will be given thereto herein. A charge controlling output circuit C is an output circuit for controlling the conductive state of a charge control P type FET 204 in this modified embodiment. A resistor R1 and NPN type bipolar transistor Q1 are the same in configuration as those of the charge control circuit la in the first embodiment shown in FIG. 1. The charge control circuit 1c in this modified example differs from that in the first embodiment in that NPN type bipolar transistors Q21 and Q22, instead of the NPN type bipolar transistor Q2 of the charge and discharge control circuit 1a, constitute a Darlington connection. Namely, one terminal of the resistor R1 and the collector terminal of the NPN type bipolar transistor Q21 are connected to a charger detection terminal OCV. The other terminal of the resistor R1 is connected to the base terminal of the NPN type bipolar transistor Q21 to thereby supply a driving bias current. The emitter terminal of the NPN type bipolar transistor Q21 is connected to the base terminal of the NPN type bipolar transistor Q22. The collector terminal of the transistor Q22 is connected to the gate terminal COUT of the charge control P type FET 204 and the emitter terminal thereof is connected to a reference potential. Thus, a Darlington connection is constituted as a whole.

If the charge control P type FET 204 is made conductive and a secondary battery 202 starts being charged, a bias current is supplied from the charger detection terminal OCV to the base terminal of the NPN type bipolar transistor Q21 through the resistor R1. The current amplified by the NPN type bipolar transistor Q21 is supplied to the base terminal of the NPN type bipolar transistor Q22 in the next stage and the current is further amplified by the transistor Q22. With the configuration of the NPN type bipolar transistors Q21 and Q22 which constitute a Darlington connection, current amplification is carried out twice. Compared with the charge control output circuit consisting of a single NPN type bipolar transistor, the circuit C can obtain high driving capability and, therefore, promptly drive the gate terminal COUT of the charge control P type FET 204.

If the NPN type bipolar transistors Q21 and Q22 which constitute the Darlington connection are actuated, the voltage Vbe of each of the transistors Q21 and Q22 is about 0.7V and the base terminal of the transistor Q21 has a potential of about 1.4V which is the accumulation of the two voltages Vbe. The driving voltage of the charger detection terminal OCV necessary to make the charge control P type FET 204 conductive and to start charging the secondary battery 202, is about 1.4V or higher, meaning that the driving voltage can be set high. Thus, it is possible to set the driving voltage far higher than the voltage of the charger detection terminal OCV at a time a reverse leak current flows into the battery through a diode D2 from the other battery pack 208, i.e., about 0.3V, and to carry out the operation for preventing the battery from being erroneously charged more surely.

Figure 5:
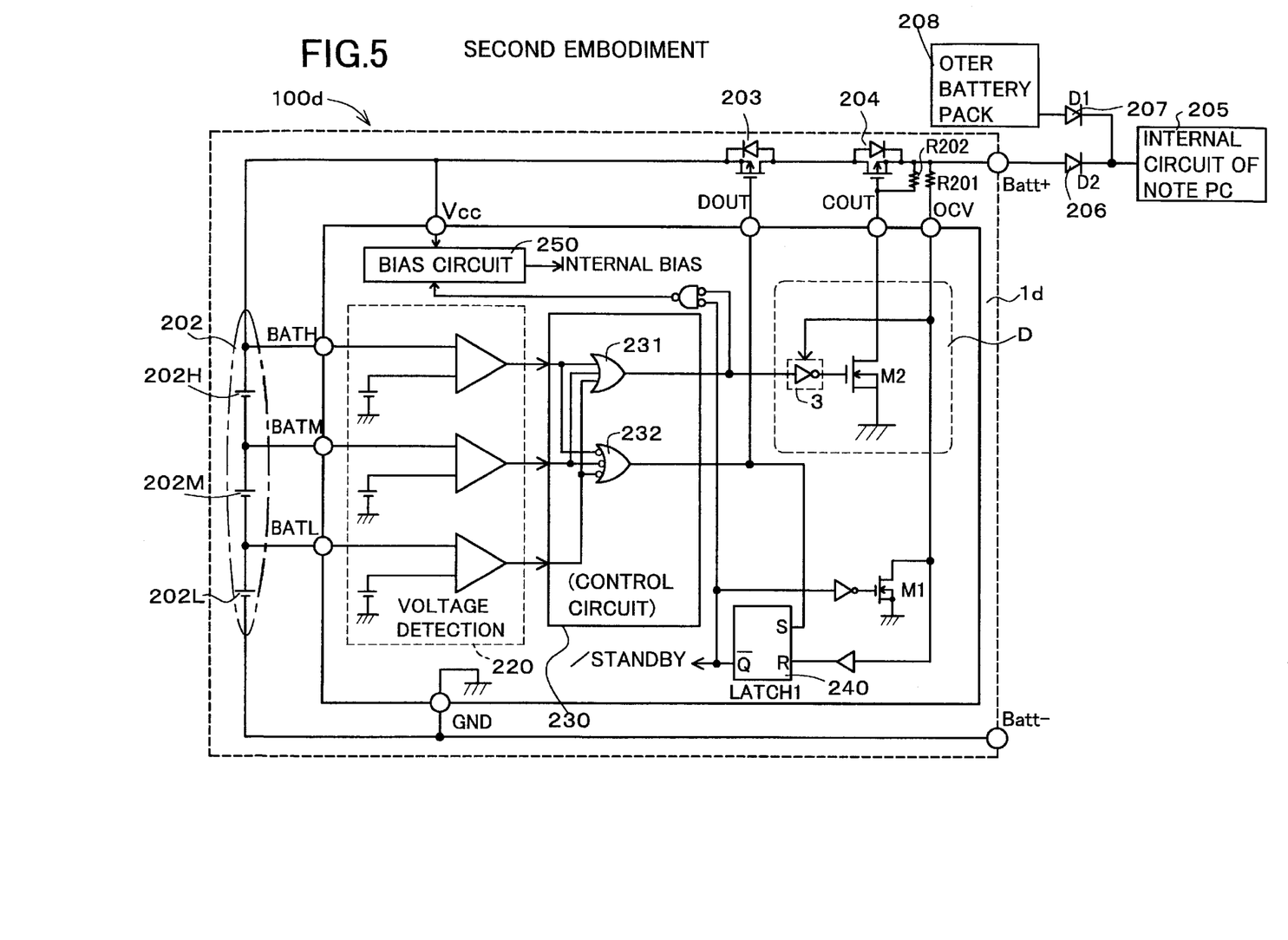
FIG. 5 is a circuit diagram of a secondary battery pack including a charge and discharge control circuit in a second embodiment according to the present invention.

FIG. 5 shows a charge and discharge control circuit id in the second embodiment according to the present invention. It is noted that the same constituent elements in the circuit 1d shown in FIG. 5 as those described in "Prior Art" part are denoted by the same reference symbols and no description will be given thereto herein. A charge controlling output circuit D is an output circuit for controlling the conductive state of a charge control P type FET 204 in the second embodiment. In this embodiment, the gate terminal COUT of the charge control P type FET 204 is driven by an open drain circuit. That is, the drain terminal of an N type FET (M2) is connected to the gate terminal COUT of the charge control P type FET 204 and the source terminal thereof is connected to a reference potential. The gate terminal of the N type FET (M2) is driven by an inverter logical gate 3 and the power supply voltage of the logical gate 3 is supplied from a charger detection circuit OCV. An overcharge control signal from an overcharge control circuit 231 is connected to the input terminal of the logical gate 3.

In this embodiment, the logical gate 3 serves as an inverter gate and the logical level of the overcharge control signal outputted from the overcharge control circuit 231 is, therefore, inverted and then outputted. The high level output voltage at this moment becomes the level of the power supply voltage of the inverter. If the voltage level exceeds the threshold voltage of the N type FET (M2), the N type FET (M2) is turned on and decreases the voltage level of the gate terminal COUT of the charge control P type FET 204 to thereby make the FET 204 conductive. Here, the power supply voltage of the inverter is supplied from the charger detection terminal OCV and the voltage of the terminal OCV becomes the power supply voltage.

In the charge and discharge control circuit, the predetermined voltage value of the detection signal also serves as the power supply voltage of the inverter for making the FET (M2) nonconductive. This makes it possible to carry out an inverter operation and, at the same time, output a predetermined voltage value. Besides, it is advantageously easy to logically conform the detection signal with the overcharge detection signal.

If no overcharge is detected and a low level signal is outputted from the overcharge control circuit 231, the signal is inverted by the inverter logical gate 3 and a high level voltage is applied to the gate terminal of the N type FET (M2). The power supply voltage of the inverter is the voltage of the charger detection terminal OCV. If the voltage exceeds the threshold voltage of the N type FET (M2), i.e., about 0.7V, the N type FET (M2) is turned on and the drain terminal thereof draws a current. This current is drawn out of the positive terminal Batt+ of a battery pack 100*d* through a resistor R202 connected between the gate terminal COUT and the source terminal of the charge control P type FET 204. Accordingly, the gate terminal COUT is applied with a negative voltage relative to the source terminal and the charge control P type FET 204 is made conductive to thereby charge the secondary battery 202.

In this charge and discharge control circuit, the switching control terminal of the charge control switch FET204 consists of an open drain circuit. Due to this, to drive the circuit, the gate terminal COUT of the open drain circuit may be biased to not less than a threshold voltage. Thus, it is possible to automatically set a predetermined voltage value at the threshold voltage of the field effect transistor FET204 without the need to provide a special configuration.

Conversely, if overcharge is detected and a high level overcharge protection signal is outputted from the overcharge control circuit 231, the signal is inverted by the inverter logical gate 3 and a low level voltage is applied to the gate terminal of the N type FET (M2). Then, the N type FET (M2) is turned off and no current flows therethrough. Accordingly, the gate terminal COUT and the source terminal of the charge control P type FET 204 become equal in potential through the resistor R202, whereby the charge control P type FET 204 is made nonconductive and a charge path toward the secondary battery 202 is disconnected.

Here, the voltage necessary for charge operation is only the voltage applied to the charger detection terminal OCV, i.e., the charging voltage applied between the negative terminal Batt− and the positive terminal Batt+ of the battery pack 100*d* and the voltage is not dependent on battery voltage. Therefore, even if the secondary battery 202 is left untouched for a long time and the battery voltage is completely discharged without any residual voltage, it is possible to recharge the secondary battery 202.

Further, the voltage of the charger detection terminal OCV at which charge operation is started is set at about 0.7V or higher. Owing to this, even if a reverse leak current flows into the battery pack 100*d* through a diode D2 from the other battery pack 208, the voltage of the charger detection terminal OCV at this moment is as low as about 0.3V and the inflow of the leak current does not, therefore, cause the start of erroneously charging the secondary battery 202.

Next, if an overcharge state is detected, the overcharge control circuit 231 outputs an overcharge control signal and the signal is, therefore, inverted by the inverter logical gate 3 to thereby turn off the N type FET (M2). In this state, even if a charger (not shown) is connected to the battery pack 100*d* and a high level voltage is applied to the charger detection terminal OCV, the gate terminal of the N type FET (M2) is kept at a low level. Thus, the N type FET (M2) is kept off, the charge control P type FET 204 is kept nonconductive and the charge path toward the secondary battery 202 is disconnected.

This operation can be ensured when a voltage detector circuit 220 detects that one of battery cells 202H, 202M and 202L is in an overcharge state. Thus, it is possible to ensure that the battery 202 is prevented from being erroneously charged even if a reverse leak current flows into the battery pack 100*d* through the diode D2 from the other battery pack 208 in a state in which the overcharged battery cell is mixed with the overdischarged cells.

As can be seen from the above, in the second embodiment, the charge controlling output circuit D is constituted by the FET serving as a voltage driving element. Hence, it is possible to obtain the same advantage as that in the first embodiment without consuming current during operation.

Figure 6:
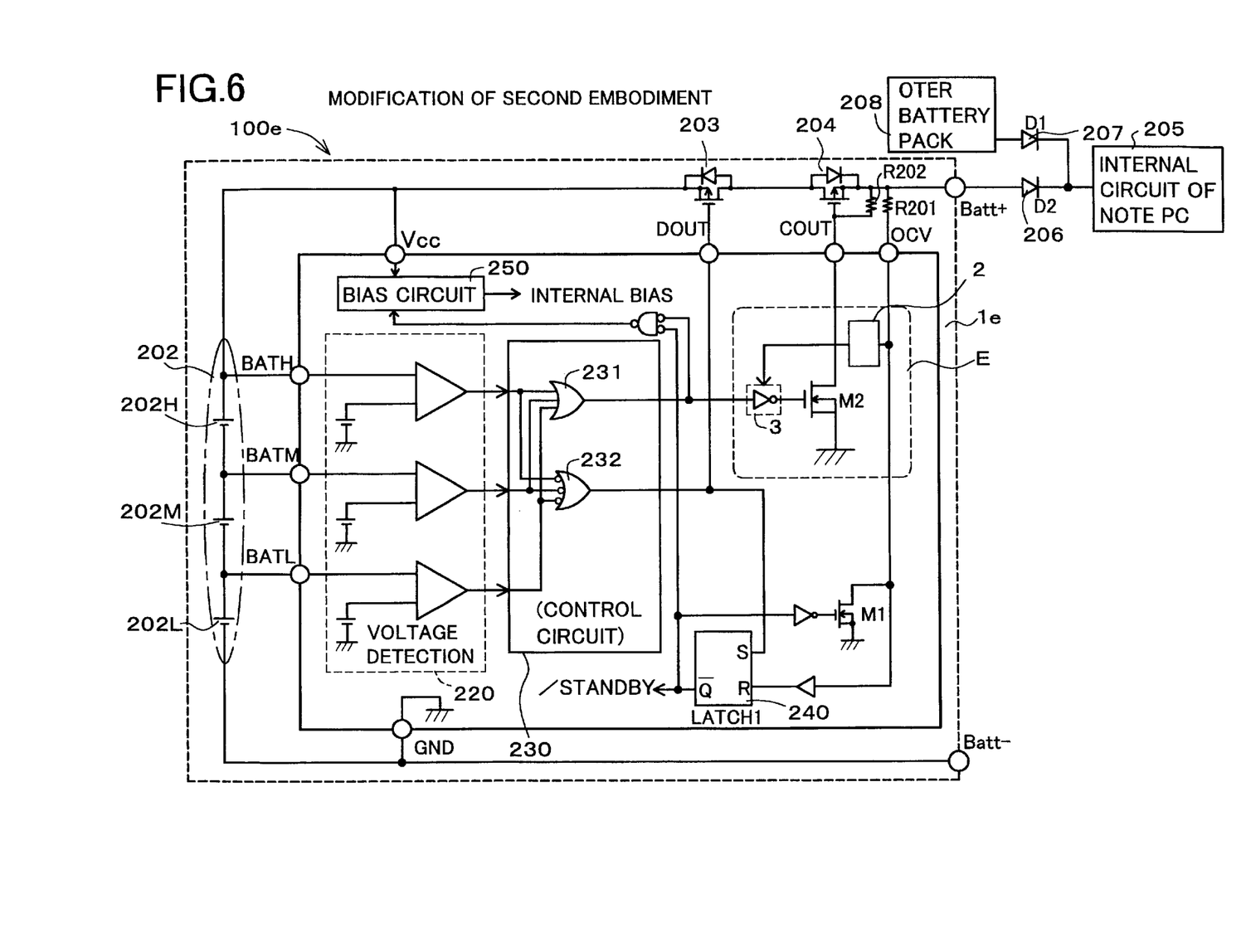
FIG. 6 is a circuit diagram of a secondary battery pack including a charge and discharge control circuit which is a modified embodiment of the second embodiment.

FIG. 6 shows a charge and discharge control circuit 1*e* as the modified embodiment of the second embodiment according to the present invention. It is noted that the same constituent elements in the circuit 1*e* shown in FIG. 6 as those described in "Prior Art" part are denoted by the same reference symbols and no description will be given thereto herein. A charge controlling output circuit E is an output circuit for controlling the conductive state of a charge control P type FET 204 in this modified embodiment. An N type FET (M2) and an inverter logical gate 3 are the same in configuration as those in the charge and discharge control circuit Id in the second embodiment shown in FIG. 5. The charge and discharge control circuit 1*e* in this modified embodiment differs from that in the second embodiment in that a voltage conversion circuit 2 is added to the charge and discharge control circuit 1*d* in FIG. 5, i.e., the circuit 2 is inserted between the power supply voltage terminal of the inverter logical gate 3 and a charger detection terminal OCV. The voltage conversion circuit 2 in this modified embodiment may be of a type shown in, for example, FIG. 3D. The voltage applied to the charger detection terminal OCV is divided and supplied as the power supply voltage of the inverter logical gate 3. If a low level signal is outputted from an overcharge control circuit 231, the signal is inverted by the inverter of the logical gate 3 and the power supply voltage of the inverter logical gate 3 is applied to the gate terminal of the N type FET (M2). If the voltage thus applied is equal to or higher than the threshold voltage of the N type FET (M2), i.e., about 0.7V, the N type FET (M2) is turned on and the drain terminal of the N type FET (M2) pulls a current. Then, the gate terminal of the charge control P type FET 204 is turned into a low level, the charge control P type FET 204 is made conductive and a secondary battery 202 is thereby charged. Alternatively, a voltage divided by the voltage conversion circuit 2 may be added to the threshold voltage of the N type FET (M2) of about 0.7V and charge operation can be started at a higher voltage of the charger detection terminal OCV. This makes it possible to start charge operation at a predetermined voltage of the charger detection terminal OCV set by the voltage conversion circuit 2. Moreover, the voltage of the charger detection terminal OCV at the start of charge operation can be set higher than that at a time a reverse leak current flows into the battery pack 100e through a diode D2 from the other battery pack 208, i.e., higher than about 0.3V. It is, therefore, possible to prevent the battery 202 from being erroneously charged more surely.

Needless to say, the present invention should not be limited to the above-stated embodiments and may be changed or modified within the scope of the present invention. For example, in the second modified embodiment of the first embodiment, the charge controlling output circuit C consists of the NPN type bipolar transistors which constitute a Darlington connection. With this configuration, the driving voltage of the charger detection terminal OCV necessary to make the charge control P type FET 204 conductive can be set to be equal to or higher than about 1.4V without providing the voltage conversion circuit 2. However, if the voltage conversion circuit 2 is added, it is possible to set the driving voltage to be higher further.

It is also possible to replace the bipolar transistor as a constituent of the charge controlling output circuit in the first and second embodiments by an FET and to replace the FET shown therein by a bipolar transistor.

Moreover, the voltage conversion circuit 2 should not be limited to those shown in FIGS. 3A–3D and may be formed by combining them in various manners. It goes without saying that the other configuration may be applicable as long as it has function of decreasing a voltage by a predetermined voltage value.

In the above-stated embodiments, description has been given to a case where each of the discharge control FET and the charge control FET is a P type FET. If the polarity of the transistors constituting the charge controlling output circuit is inverted, an N type FET is also applicable. Besides, it is possible to use other types of switch elements and components such as a relay instead of the FETs.

What is claimed is:

1. A charge and discharge control circuit for an external secondary battery, the charge and discharge control circuit making an external charge control switch nonconductive based on that an overcharge state of the external secondary battery is detected and interrupting a charge operation of the external secondary battery, the charge and discharge control circuit comprising:

a charge control element for making the charge control switch conductive when a first voltage not less than a predetermined voltage is applied to a detection terminal for detecting whether a charger is connected thereto or not, thereby making the charge operation of the secondary battery possible, and for making the charge control switch nonconductive when a second voltage not more than the predetermined voltage is applied to the detection terminal, thereby making the charge operation of the secondary battery impossible.

2. The charge and discharge control circuit according to claim 1, wherein the charge control element includes a first switching element which turns on based on the first voltage not less than the predetermined voltage and makes the charge control switch conductive, and turns off based on the second voltage not more than the predetermined voltage and makes the charge control switch nonconductive.

3. The charge and discharge control circuit according to claim 2, wherein the first switching element comprises a bipolar transistor having a collector terminal connected to a switching control terminal of the charge control switch, a base terminal connected to the detection terminal and an emitter terminal connected to a reference potential of the secondary battery.

4. The charge and discharge control circuit according to claim 2, wherein the first switching element comprises Darlington-connected bipolar transistors having a collector terminal connected to a switching control terminal of the charge control switch, a base terminal connected to the detection terminal and an emitter terminal connected to a reference potential of the secondary battery.

5. The charge and discharge control circuit according to claim 2, wherein the first switching element comprises a field effect transistor having a drain terminal connected to a switching control terminal of the charge control switch, a gate terminal connected to the detection terminal and a source terminal connected to a reference potential of the secondary battery.

6. The charge and discharge control circuit according to claim 2, wherein the charge control element includes a regulation element for regulating a voltage of the detection terminal that the first switching element is made conductive, to a voltage not less than the predetermined value.

7. The charge and discharge control circuit according to claim 2, wherein the charge control element includes a second switching element which makes the first switching element nonconductive based on that the overcharge state of the secondary battery is detected.

8. The charge and discharge control circuit according to claim 7, further comprising an overcharge detection circuit for detecting the overcharge state of the secondary battery; wherein the second switching element comprises a bipolar transistor having a collector terminal connected to the first switching element, a base terminal connected to the overcharge detection circuit and an emitter terminal connected to a reference potential of the secondary battery.

9. The charge and discharge control circuit according to claim 7, further comprising an overcharge detection circuit for detecting the overcharge state of the secondary battery; wherein the second switching element comprises an inverter having a power supply terminal connected to the detection terminal, an input terminal connected to the overcharge detection circuit and an output terminal connected to the first switching element.

10. A charge and discharge control apparatus for a secondary battery comprising:

a detection terminal for detecting whether a charger is connected thereto or not;

an overcharge detection circuit for detecting an overcharge state of the secondary battery;

a charge control switch for interrupting a charge operation of the secondary battery based on that the overcharge state is detected by the overcharge detection circuit; and a charge control circuit for making the charge control switch conductive when a first voltage not less than a predetermined voltage is applied to the detection terminal, thereby making the charge operation of the secondary battery possible, and for making the charge control switch nonconductive when a second voltage not more than the predetermined voltage is applied to the detection terminal, thereby making the charge operation of the secondary battery impossible.

11. The charge and discharge control apparatus according to claim 10, wherein the charge control circuit includes a first switching element which turns on based on the first voltage not less than the predetermined voltage and makes the charge control switch conductive, and turns off based on the second voltage not more than the predetermined voltage and makes the charge control switch nonconductive.

12. The charge and discharge control circuit according to claim 11, wherein the first switching element comprises a bipolar transistor having a collector terminal connected to a switching control terminal of the charge control switch, a base terminal connected to the detection terminal and an emitter terminal connected to a reference potential of the secondary battery.

13. The charge and discharge control circuit according to claim 11, wherein the first switching element comprises Darlington-connected bipolar transistors having a collector terminal connected to a switching control terminal of the charge control switch, a base terminal connected to the detection terminal and an emitter terminal connected to a reference potential of the secondary battery.

14. The charge and discharge control circuit according to claim 11, wherein the first switching element comprises a field effect transistor having a drain terminal connected to a switching control terminal of the charge control switch, a gate terminal connected to the detection terminal and a source terminal connected to a reference potential of the secondary battery.

15. The charge and discharge control circuit according to claim 11, wherein the charge control circuit includes a regulation element for regulating a voltage of the detection terminal that the first switching element is made conductive, to a voltage not less than the predetermined value.

16. The charge and discharge control circuit according to claim 11, wherein the charge control circuit includes a second switching element which makes the first switching element nonconductive based on that the overcharge state of the secondary battery is detected by the overcharge detection circuit.

17. The charge and discharge control circuit according to claim 16, wherein the second switching element comprises a bipolar transistor having a collector terminal connected to the first switching element, a base terminal connected to the overcharge detection circuit and an emitter terminal connected to a reference potential of the secondary battery.

18. The charge and discharge control circuit according to claim 16, wherein the second switching element comprises an inverter having a power supply terminal connected to the detection terminal, an input terminal connected to the overcharge detection circuit and an output terminal connected to the first switching element.

* * * * *